United States Patent [19]

Engle et al.

[11] Patent Number: 5,953,487

[45] Date of Patent: Sep. 14, 1999

[54] VIDEO RECORDING AND PLAYBACK APPARATUS

[75] Inventors: Joseph Craig Engle, Indianapolis; Robert Harold Metcalfe, Franklin; Sung Jo Kim, Carmel; Jesse Edward Herzberg, Indianapolis, all of Ind.; Hans-Joachim Platte, Hemmingen, Germany

[73] Assignee: Thomson Consumer Electronics, Indianapolis, Ind.

[21] Appl. No.: 08/981,837

[22] PCT Filed: Jul. 8, 1996

[86] PCT No.: PCT/US96/11369

§ 371 Date: Jan. 7, 1997

§ 102(e) Date: Jan. 7, 1997

[87] PCT Pub. No.: WO97/03442

PCT Pub. Date: Jan. 30, 1997

Related U.S. Application Data

[60] Provisional application No. 60/009,329, Dec. 28, 1995.

[30] Foreign Application Priority Data

Jul. 11, 1995 [DE] Germany .......................... 195 25 226

[51] Int. Cl.⁶ ................................................. H04N 5/783
[52] U.S. Cl. .................................. 386/68; 386/95; 386/81
[58] Field of Search ................................. 386/46, 95, 68, 386/80, 81, 78, 79, 57, 52; H04N 5/76, 5/783

[56] References Cited

U.S. PATENT DOCUMENTS

| | | | |
|---|---|---|---|
| 4,519,003 | 5/1985 | Scholz | 358/335 |
| 4,549,231 | 10/1985 | Namiki | 360/14.2 |
| 5,333,091 | 7/1994 | Iggulden et al. | 360/14.1 |
| 5,748,332 | 5/1998 | Lee | 386/68 |

FOREIGN PATENT DOCUMENTS

| | | |
|---|---|---|
| 526739 | 2/1993 | European Pat. Off. . |
| 57-088542 | 6/1982 | Japan . |
| 58-146072 | 8/1983 | Japan . |
| 59-221851 | 12/1984 | Japan . |
| 64-79990 | 3/1989 | Japan . |
| 4-283447 | 10/1992 | Japan . |
| 4-337548 | 11/1992 | Japan . |

OTHER PUBLICATIONS

*Patent Abstracts of Japan, vol. 017, No. 082, Feb. 18, 1993 and Japanese Pat. 4–283447.
**Patent Abstracts of Japan, vol. 007, No. 266, Nov. 26, 1983 and Japanese Pat. 58–146072.
***Patent Abstracts of Japan, vol. 009, No. 097, Apr. 26, 1985 and Japanese Pat. 59–221851.
****Patent Abstracts of Japan, vol. 017, No. 184, Apr. 9, 1993 and Japanese Pat. 4–337548.
*****Patent Abstracts of Japan, vol. 006, No. 171, Sep. 4, 1982 and Japanese Pat. 57–088542.

Primary Examiner—Huy Nguyen
Attorney, Agent, or Firm—Joseph S. Tripoli; Joseph J. Laks; Francis A. Davenport

[57] ABSTRACT

A video recording and playback device has a control track recorder for recording a control track signal including timing edges recorded on a tape or other storage medium together with the video program. A decoder is coupled to the control track signal and to the tape drive for switching among a forward play mode, a forward skip mode and a rewind mode, as a function of play, skip and rewind codes inserted into the control track as phase variations of edges other than those used for timing, or preferably as pulses with sloping edges distinct from the timing edges. In addition to selectively skipping sections of the video program preceded by a skip code and followed by a play code, such as commercial breaks, the device permits user editing of play and skip codes and selective multiple replays of sections of the video program preceded by a play code and followed by a rewind code. Replay can be continuous or for a predetermined number of replays, encoded in the control track signal with the play, skip or rewind codes. The play, skip and rewind codes and/or the number of play repetitions are user editable from an on screen menu for changing the content to be presented during a later playback.

13 Claims, 3 Drawing Sheets

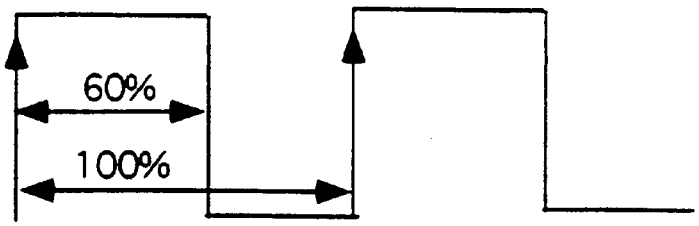
FIG. 2A
STANDARD CONTROL TRACK PULSES
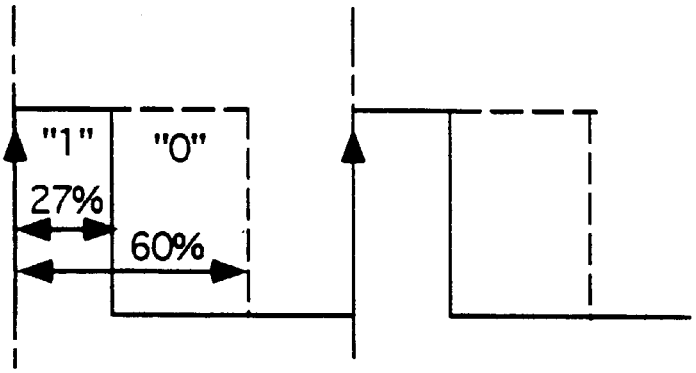
FIG. 2B
CODED CONTROL TRACK PULSES
FIG. 2C
CONTROL TRACK DATA PULSES
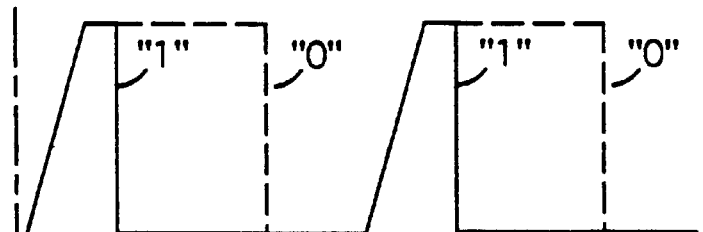
FIG. 3
CONTROL TRACK PULSES CODED "1" + 8BITS
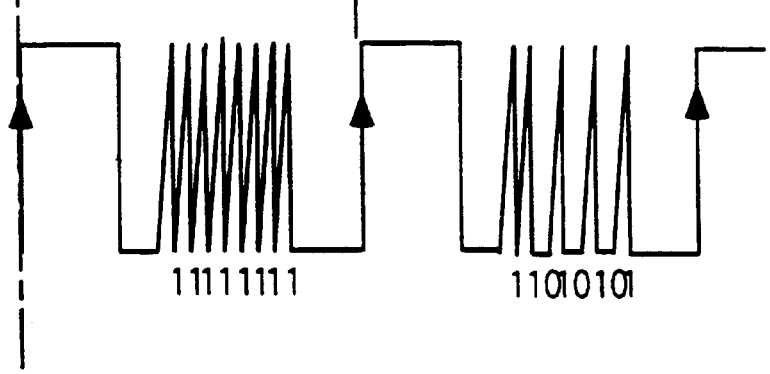

VIDEO RECORDING AND PLAYBACK APPARATUS

This is a continuation of U.S. patent application Ser. No. 60/009,329 filed Dec. 28, 1995.

BACKGROUND OF THE INVENTION

This invention relates to the field of image recordation and playback, and in particular concerns user programming of control commands and data referring to recorded image tracks.

Current image recording formats for consumer equipment and the like utilize a high proportion of the available recording media for program content, namely video and audio. There is often little recording capability available for occasional use, such as to record user derived commands and data. One low data rate signal that can be recorded on a tape or similar medium is a timing indication signal. In the VHS tape format, control track pulses are generated at the image picture rate and are recorded together with the program content. On replay, these pulses are utilized to control reproduction so as to maintain the same rate as when recorded.

The control track pulses are recorded along an edge of the tape and mark each frame, whereas the video program content is recorded across the width of the tape. Typically in the NTSC TV standard the control track pulses have a repetition period of about 16.6 milliseconds and a duration or duty cycle of about 50%, that is, alternately 8 milliseconds at one level (e.g., high) and 8 milliseconds at another level (e.g., zero). In PAL operation the repetition period is 20 milliseconds and the pulse duration is about 10 milliseconds.

It has been recognized that such a control track signal does not make good use of the magnetic media. The part of the recorded control track signal that is needed to control timing of playback to match the image picture rate, is only a single edge such as the leading rising edge during each period. The remainder of the control track between the rising edges of successive periods could be varied to encode additional data.

In the early 1980's the Video Index Search Signal (VISS) was introduced and utilized an existing recording track for supplementary data such as a count for referencing particular portions of the program on the tape. The rising edges of the control track signal are used for playback speed control as above. According to the VISS standard, the trailing, non-time critical edge of the control track pulse can be controllably phase shifted, while maintaining the timing of the leading edge for use in controlling playback speed. Data is encoded by varying the phase of the trailing edge of the recorded command track signal between two distinct phases, representing digital true and false or one and zero value data bits.

This phase encoding method is uncomplicated. A logical "1" value can be encoded, for example, by advancing the phase of the trailing edge, thus shortening the positive portion of the control pulse to a duration of about 27.5% of the pulse repetition period. A logical "0" value delays the trailing edge as compared to a nominal 50% duty cycle, for example to produce a pulse of 60% duration. Simple timing and gating circuits can distinguish between pulses having a duty cycle that is longer or shorter than a reference duration (e.g., 50%), to decode the data into a serial digital data stream using this relatively dependable and inexpensive communication channel technique. However, each control track pulse period can encode only one data bit to a one or zero value. The data rate is slow.

Video cassette recorders (VCRs) can employ the VISS method to mark the starting point of a recording or a segment of a recording, as a means to enable cuing for subsequent replay. A standard for such index signals employs a marker sequence consisting of a 63 bit succession in which the first and last bits are logical zeros and all the intermediate bits are logical ones, the zeros and ones being distinguished by the phase difference of the trailing edge of the control pulse.

A similar use of control track encoding is employed by a system known as VHS Address Search Signal or VASS, which also uses phase difference of the trailing edge to encode logical data. The VASS system enables a digital address to be written to the control track during recording. The VASS signal may be used as an elapsed time indicator or to provide specific segment addressing for editing or control purposes. The standard VASS format contains an 11 bit header, similar to the header in VISS, with logical ones bounded by single zeros. The header is followed by a 16 bit data section that is typically used to store a four digit segment address. The segment address written onto the tape by phase variation of the command track pulse, is incremented by one for each new VASS address code. At the start of a new recording operation, the counter is reset. The VASS address codes can be written redundantly to ensure that they are decoded correctly, for example being written four times and requiring at least two successful decodes to be considered valid.

Similar data encoding/decoding techniques can be used to record information other than segment numbers or timing codes. U.S. Pat. No. 5,333,091 teaches an automated commercial break detector known as Commercial Free or Commercial Advance, whose purpose is to mark commercials so they can be automatically passed, blanked or played at fast-forward under control of a decoder responsive to the command track codes. The video and audio signals are analyzed for certain attributes during recording for identifying each commercial based on algorithms applied to audio and video parameters. Features are detected such as blank frames, advertising blocks, logos and the like, which are likely to be found in commercial messages, or which often precede or follow commercial messages. A fast-forward wind command is placed in the command track at the beginning of detected commercials, and a resume play command is recorded at the end.

The recorded commands need to slightly precede the beginning and end of the commercial break for completely passing over the unwanted commercial message. The video signal is analyzed for likely commercial breaks when recorded together with the timing signal on the command track. Then in a second pass, both the beginning and ending control commands are encoded or marked by overwriting the trailing edge of the existing command track signal. During subsequent user playback, upon detection of the fast-forward wind mark the video recorder is switched into a wind or fast-forward scan mode of operation. Detection of a resume-play pulse terminates the wind mode and resumes the play mode. Thus commercial advertising blocks are skipped over and only the wanted program material is replayed.

Detection of commercial advertising breaks during a television program can be difficult to accomplish accurately. Although many commercial breaks conform to a typical format or sequence of parameters, for example having one or more black frames between the program and the commercial break, some commercial breaks for one reason or another do not conform. A VCR having the capability of marking commercial breaks may, for example, accurately identify commercial breaks about 80% of the time.

An automated detection algorithm may fail to identify variant commercials with the result that the start of a commercial break is missed. When later viewing the tape, the user is required to view the unwanted commercial message. The opposite problem occurs when wanted program content happens to contain aspects of format that resemble a commercial break, and consequently satisfy the automated detection algorithm. In that case, a portion of the program content may be identified erroneously as a commercial break with and marked with wind and play marks encoded on the control track. Wanted program content then is skipped over when the tape is replayed, which is even more annoying than the presence of an occasional commercial. Should this occur, the user may wish to disable the commercial skipping feature entirely, so as not to miss wanted content.

Assuming that commercial breaks are identified with 100% accuracy and marked for commercial suppression, the user nevertheless may wish to view certain commercial breaks. It would be advantageous if this could be done without disabling the commercial break suppression feature entirely, and without the need for multiple remote control operations so that the suppression of commercials can be suspended for particular commercials only.

Commercial Advance concerns removing or skipping over part of the programming. Methods also are known for repeatedly playing back a recorded program or segment of a program between marked spots. For example, an announcement, advertisement or demonstration may be duplicated throughout the duration of a magnetic recording tape. When the tape end is reached and detected, the image replay equipment automatically rewinds to the start of the tape and recommences play back. This automatic repeat method may involve editing and duplicating the replay material repetitively along the tape, which may prove challenging for the occasional or non-professional user. A longer program simply may play from beginning to end and then repeat repetitively until manually stopped.

Repeated image replay can be accomplished by switching the VCR between a play mode and a rewind mode upon sensing an end mark or beginning and end marks on the tape, such as particular codes, a reflective marker, etc. Tape time or footage counter settings maintained by the VCR can also be used for this purpose. For example, at the start of a segment to be replayed, a tape counter is reset to zero. At the end of the replay material, rewind is selected and the counter (or timer) reading is stored automatically. The rewind continues until the count is zero, and play is selected. When the count reaches the stored count, rewind is selected again, enabling successive replays. Alternatively the tape length may be matched to that of the replayed message using an end-of-tape marker causing the tape to be rewound to the start or to an earlier marker at which the play mode is automatically selected and the material is replayed again.

Beginning and end markers are resident on the tape, whereas tape counter techniques operate from information stored in the replay device or generated by the replay device. Methods relying on storage in the replay device have the limitation that changes in tape counter setting, for example occurring with removal of the tape from the replay device, defeat the automation. Markers resident on the tape are independent of this limitation but have the limitation that the beginning and end markers are relatively permanent and immovable indicia.

U.S. Pat. No. 4,549,231 to Namiki shows an arrangement in which a control track is coded for fast forward and then play in order to skip unwanted portions of the video program.

European Publication 0526739A1 of Hitachi, indicates the desirability of encoding various commands along with the recorded video signal.

A simple method and apparatus are needed which allow a user manually to program a sequence of reproduced images and to store, for example on the tape, suitable control commands to facilitate future automated reproduction of the image sequence.

SUMMARY OF THE INVENTION

Such a method and apparatus are provided according to inventive aspects of video recording and playback device with a control track recorder for recording a control track signal including timing edges recorded on a tape or other storage medium together with the video program. A decoder is coupled to the control track signal and to the tape drive for switching among a forward play mode, a forward skip mode and a rewind mode, as a function of play, skip and rewind codes inserted into the control track as phase variations of edges other than those used for timing, or preferably as pulses with sloping edges distinct from the timing edges. In addition to selectively skipping sections of the video program preceded by a skip code and followed by a play code, such as commercial breaks, the device permits user editing of play and skip codes and selective multiple replays of sections of the video program preceded by a play code and followed by a rewind code. Replay can be continuous or for a predetermined number of replays, encoded in the control track signal with the play, skip or rewind codes. The play, skip and rewind codes and/or the number of play repetitions are user editable from an on screen menu for changing the content to be presented during a later playbacks.

Control data including the play, skip and rewind codes is added to existing control track encoded control data, such as timing control data, in a manner that retains the existing control or timing data, using the sloping leading edges of the added supplementary data to distinguish the added data from the sharp leading edges of the timing or other control signal.

A further inventive aspect is the capability of user review and editing of control data encoded on a control track, so as to permit the user to vary the manner of replay of a tape from time to time, and to alter the sequence of segments to be skipped, played or repeated. This aspect further enables a user to reprogram control codes inserted by an automatic commercial break identifier, as desired without necessarily disabling commercial suppression entirely.

Accordingly the invention facilitates subsequent replay of only those images or segments that are wanted by the user.

According to the invention a video recording and playback apparatus comprises a video recorder which includes a drive for recording a video program signal in a first track on a storage medium, and for playback of the video program recording from the storage medium. A control track signal processor records a control track signal encoded with digital data in a second track on the storage medium. A decoder is responsive to the control track signal upon playback of the video program recording for decoding the digital data and coupling the digitial data to the drive for switching the apparatus among a forward play mode, a forward skip mode and a rewind mode, as a function of respective play, skip and rewind codes in the digital data, for selectively replaying, a predetermined number of occurrences, sections of the video program preceded by a play code and followed by a rewind code.

BRIEF DESCRIPTION OF THE DRAWING

FIGS. 2A and 2B illustrate control track pulses before and after recording of information by phase modulation.

FIG. 2C illustrates a control pulse prior to overwriting a control track record.

FIG. 3 illustrates a control track pulse prior to recording employing an inventive coding method.

DETAILED DESCRIPTION

Figure 1:
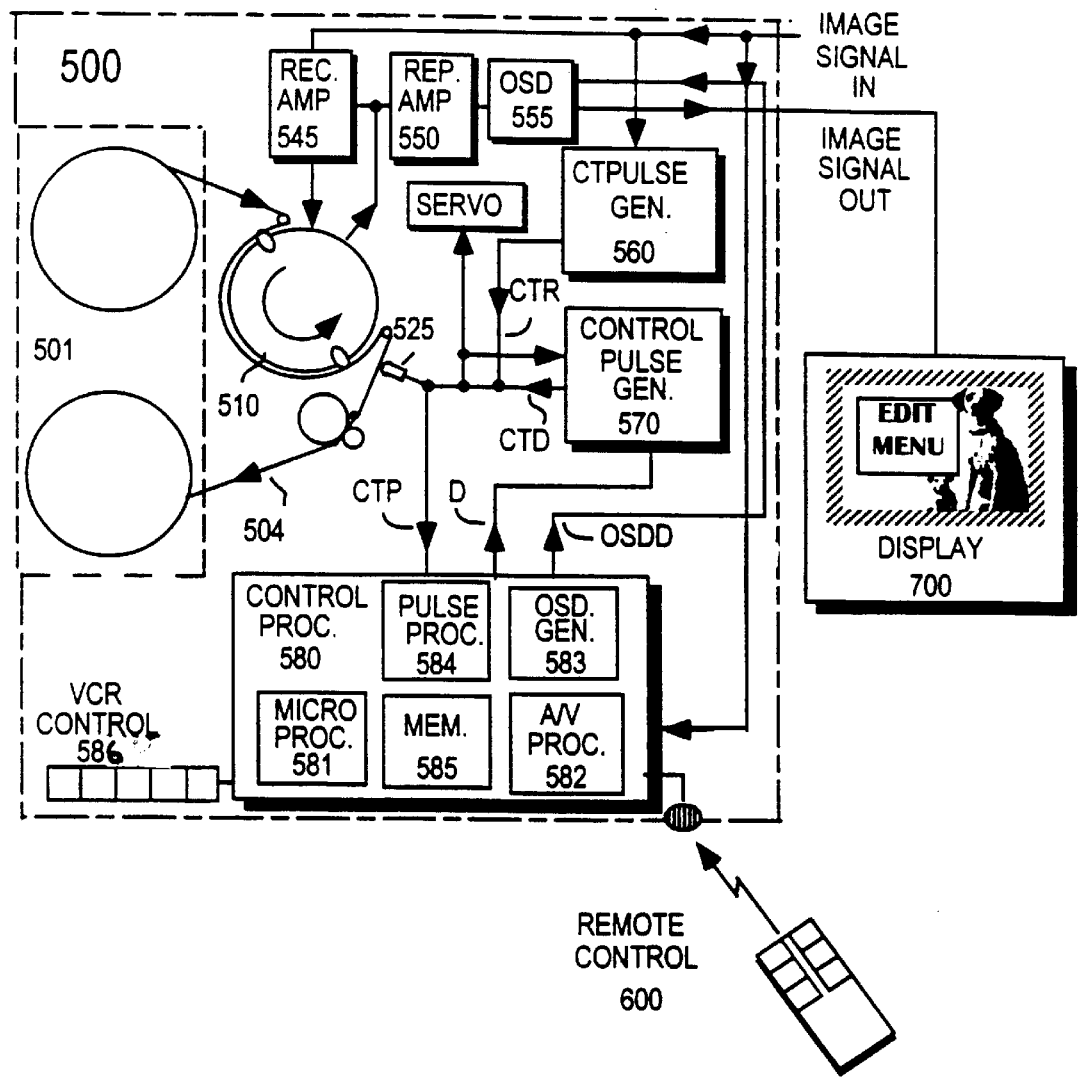
FIG. 1 is a block diagram of an image recording and replay device 500 employing an inventive control system.

An exemplary recording and replay device 500 employing an inventive control system is depicted in the block diagram of FIG. 1. A recording medium, for example magnetic tape 504, is carried on reels in a cassette 501. During the recording mode, an image signal is coupled to device 500 for processing by recording amplifier 545 and is recorded on tape 504 in the form of magnetic variations, via rotating head assembly 510. During the replay or playback mode the image signal is read from tape 504 and processed by replay amplifier 550, which reproduces the image signal for display and other processing. The image signal also is coupled via an on screen display adding device 555 which can insert status and control information into the image signal prior to coupling to display 700.

The invention as shown and described concerns an exemplary recording format wherein control data may be recorded together with a control track. Other recording formats are possible to facilitate the storage and editing of user derived data. For example, data can be inserted at unique, specific record locations, which obviates the need to share recorded track capacity, for example with timing data.

In FIG. 1, in the record mode, a control track is written along an edge of tape 504 by a read/write head 525. The control track is generated by a control track pulse generator 560, which is locked to the recorded image signal and has a frequency derived from the image frame rate. FIG. 2A depicts an exemplary control track pulse signal CTR produced by generator 560 prior to modulation for recording of data. As has been described, the sharply rising pulse edge shown in FIG. 2A, and denoted with an arrow head, is detected and utilized as a time reference by the replay servo system. The falling or trailing edge may be phase or position modulated responsive to data bits D, as shown in FIG. 2B, wherein a 27% duration pulse is generated responsive to a data value "1" and a 60% pulse responsive to a data value "0". This does not affect the spacing of the rising edges but provides a means by which data values can be encoded and distinguished.

A control pulse generator 570 is coupled to the control track record play head 525. Control pulse generator 570 produces a frame rate ramp-shaped pulse signal CTD, shown in FIG. 2C. The control pulse signal CTD is ramp shaped to permit over-recording on the control track without a sharp rising edge. Thus, control pulse CTD does not insert a timing reference edge when replayed. The duration of the control pulse CTD is determined by control data D from a control processor 580. The timing of the control pulse CTD is accurately determined by a clock pulse generator (not shown) whose signal is referenced to the reproduced control track or CT pulse CTP read from the tape during replay.

Control processor 580 provides a variety of functions including commercial break detection, control pulse encoding, replay control pulse processing, on screen display generation and program execution. The control processor also receives user commands either from control switches 586 on unit 500 or via a remote control signal from controller 600. Control processor 580 includes a microprocessor 581 and a memory 585 with control programming and computational and storage space. In a recording mode an audio/video processor 582, which forms part of processor 580, receives the input image and audio signals for automated signal analysis to detect the presence of commercial advertising breaks. Subsequently the recording is automatically reviewed and commercial break starting and ending points are encoded by overwriting the control track signal with marker codes. A control data signal D is coupled to pulse generator 570 for generation of overwriting control pulses CTD.

During subsequent user replay of the command track encoded tape, the control track signal CTP is extracted by read head 525 and is processed within control processor 580 to decode and respond to various control commands. The control commands are separated from the control track pulse edge by pulse processor 584. Pulse processor 584 employs various means for detecting and recovering the encoded control data. For example, processor 584 may utilize the sharply rising edges of the command track signal to increment a timer or counter which is compared with the recovered control data, as well as for controlling playback timing.

A coincidence which occurs during the first 27% of the CT period is decoded as a logical 1, and a longer coincidence occurring in excess of approximately 50% of the CT period is decoded as a logical 0. The various systems employing control instructions encoded in the control track may be initially distinguished by the numbers of logical symbols recovered from the control track. For example, the VISS signal comprises 63 bits, where the first and last bits are logical "0" with the remaining 61 bits logical "1". The VASS system employs a 27 bit address word which includes an eleven bit header comprising leading and trailing logical zeros with the intervening nine bits logical one. The automated commercial skipping system utilizes control words of 8, 12 and 29 logical "1" bits. Hence an inventive manual control method may usefully employ similar control words to enable utilization of existing pulse discrimination and control circuitry resident within control processor 580.

An inventive data encoding method is depicted in exemplary FIG. 3 which permits supplementary data bits to be encoded during the period of the control track waveform. In FIG. 3 exemplary 8 bit supplementary data words are shown, written following the encoded logical "1" value of the phase modulated coded control track signal CTR. In the exemplary 8 bit word, a logical "1" value is represented by a ramp shaped pulse signal occurring at one of 8 evenly spaced time positions during the low portion of control track signal CTR, and a logical "0" value is represented by the absence of a ramp shaped pulse signal at the corresponding time position. The exemplary ramp signals may, for example, be derived from a locked clock which generates 1 millisecond clock pulses. The use of a clock locked to the frequency of command track signal CTR is preferred, to simplify decoding during replay. For example, to recover the 8 bit exemplary supplementary data word requires that the 27% logical "1" phase modulated value of signal CTR be detected. Such detection then enables a timed detection window in which the 8 bits of ramped pulse modulated data can occur. Microprocessor 581 may determine the presence or absence the 8 bit control word and each of its bits, to distinguish between the various control track encoded control systems.

An 8 bit word with logical "1"'s may be encoded for a plurality of control track periods to provide synchronization of the 1 millisecond clock generator. Following clock synchronization, a predetermined data pattern may be encoded in alternate control track periods with the complement encoded in the intervening periods. When replayed, the predetermined data pattern and it's complement may be tested by microprocessor 581 provide an error check capability prior to decoding a control instruction contained in succeeding 8 bit words. The supplementary data bits may be encoded over a period of 15 control track cycles, for example 5 bytes of logical "1", 4 bytes of sync word and complement, 6 bytes of control data.

The supplementary data bits may be encoded during the logical "1" period of VISS, VASS or commercial skipping signals, when phase modulated shortening of the pulses in control track signal CTR make available a portion of the period for encoding data. Similarly, low going pulses can encode data during a logical "0" pulse of control track signal CTR, provided the rising edges of the low going pulses are ramped so as to be distinguishable from the sharply rising timing edges of signal CTR. Ramped and sharply rising edges can be distinguished, for example, using a high pass filter.

The provision of manually programmed replay image automation advantageously requires additional control functions and commands. These additional manual control functions may not only provide user programming capability, but in addition may enhance the operation and accuracy of the previously described control track encoded control systems such as commercial identification or categorization and skip command encoding for all commercials or those of a particular category.

An inventive user programmed sequence may advantageously provide an automatic repeat capability for educational, demonstration and sales purposes. A VCR thus may be manually programmed to replay user selected sequences for one or more repetitions or until the VCR receives a signal code, interspersed with non-required sections that can be skipped.

The user may program the sequence of commands by selecting an on screen menu as shown in FIG. 1, wherein an EDIT menu can be selected for presentation on display 700 using control inputs 581 or remote control 600. The EDIT menu can be one of various menus offering selections such as time setting, channel programming and the like. The EDIT menu can include an AUTO REPEAT selection, for example linking to a sub-menu. The AUTO REPEAT sub-menu prompts the user to effect tape transport or play/rewind operations for positioning the tape at the beginning and end of tape segments to be processed according to user selections when the tape is replayed.

For play processes involving wanted segments to be played one or more times, the user can be prompted to manually cue the tape to the beginning of the first wanted replay selection. The user selects PLAY MARK on the menu or submenu, to designate a play start point. The encoding of the PLAY mark is enabled following the user acknowledging OK on the menu, whereupon the appropriate code is placed on the tape command track. The actual location of the PLAY mark or code may be written ahead of the start of the wanted material by a predetermined length, to anticipate user reaction time and to compensate for media braking times. The distance between the PLAY mark and the spot at which program play is to commence, can also be indicated by a code on the command track in association with the PLAY mark, whereby the timing of tape transport can be varied, for example depending upon whether the PLAY mark is encountered during a fast-forward wind or scan, as opposed to a lower speed blank play operation.

After entering a PLAY mark code, the tape is preferably played forward, or can be scanned forward. If an unwanted segment is encountered, the user can stop and position the tape at the beginning of the unwanted segment (i.e., the end of the previous wanted segment), and place a SKIP FORWARD command on the command track by a suitable selection from the menu. Preferably, the VCR then enters a forward scan mode to advance to the end of the unwanted segment as the user watches and can forward wind, play, stop, reverse, etc., to manually position the tape at the beginning of the next wanted segment (the end of the preceding unwanted segment). As above, the PLAY, SKIP FORWARD and similar codes can be written on the command track in advance of the tape position to which they refer. The SKIP FORWARD mode allows the recorded images to be viewed at higher than normal speed until the next wanted sequence is encountered. Alternatively, the user can choose to play forward at normal speed. In any event, with the tape positioned at the next position for resuming play during replay of the tape, the tape being either halted or moving,. the user selects PLAY from the menu and enters the corresponding command code.

Upon entry of the PLAY command following a previous SKIP FORWARD, the VCR automatically rewinds to a location ahead of the point at which SKIP FORWARD was selected and enters a PLAY command at a position in advance of the spot at which play is to commence, as described above, to allow sufficient time for the VCR to brake during a replay of the tape and begin to play at the desired spot.

In each case, the SKIP FORWARD commands and PLAY commands are written over the phase modulated pulse data on the command track. SKIPs and PLAYs normally occur in pairs, their order determining whether a particular section is played or skipped. Inasmuch as the normal starting mode for playback of a VCR is the play mode, the first control code encountered on a tape is normally a SKIP FORWARD. However, either of the paired SKIP FORWARD and PLAY codes can be placed on the command track before the other is placed. For example, the sequence of programming can involve placing a PLAY code at the end of a section to be skipped, and then placing a SKIP FORWARD command at the beginning of the section to be skipped. Alternatively, after writing a SKIP FORWARD command, the tape can be shuttled automatically to a location in advance of that point, whereupon the user enters a PLAY mode command to over write the command track.

Similarly, the command track codes can define a SKIP REARWARD or rewind command causing the tape to wind rearwardly until a PLAY command is encountered. This permits the user to loop or replay a defined segment of the tape, as well as selectively to play certain segments and skip others, via user programmable and changeable command codes placed on the command track.

As discussed above, it is possible to insert SKIP and PLAY commands to omit the playback of commercial messages. A user viewing taped content also may decide after viewing a particular segment that it should be skipped. Generally, users will elect to insert codes forwardly, but often may decide after viewing a segment (e.g., an undetected commercial) to place a PLAY code at the end and then rewind to the beginning. Having written a PLAY command on the command track with the VCR during programming SKIP and PLAY codes, the VCR can determine, for example from user input signals, to play the tape starting from the entered PLAY command until the user determines the end of the wanted material and again selects SKIP FORWARD from the menu. When programming from the menu the recorded images may be viewed at higher than normal speed until the next point requiring a command track code is encountered.

The user may select and assemble a sequence of images from a recording containing both wanted and unwanted material. The method described briefly above may also include control commands to SKIP REARWARD, enabling a sequence to be assembled from non-sequential records. However, a sequence assembled from non-sequential records may require specific GO TO commands and segment addressing to avoid unwanted repeating of sections to be played.

Some of the bits in the data encoded by overwriting the command track can be used to encode a number of repeat cycles. When the selection of wanted records is complete the user may select REPEAT from the menu, which prompts selection of a continuous loop or repeat until the STOP mode is selected, or selection of a number of repeat loops to be performed before stopping automatically or continuing with playback. The number of repeat loops to be performed may be encoded in the PLAY MARKS. For example, the PLAY MARK may have a range between 11111110000 to 11111111111. The PLAY MARK is represented by the first group of seven bits being set all true, with the remaining four bits representing the number of times the repeat loop is traversed for the respective segment. The PLAY MARK may be defined as shown in the following exemplary table:

| PLAY MARK | | DEFINITION |
|---|---|---|
| 1111111 | 0000 | Continuous loop |
| 1111111 | 0001 | loop once |
| 1111111 | 0010 | loop twice |
| 1111111 | 0011 | loop thrice |
| ------- | ---- | ------- |
| ------- | ---- | ------- |
| 1111111 | 1110 | loop fourteen times |
| 1111111 | 1111 | loop fifteen times |

Figure 4:
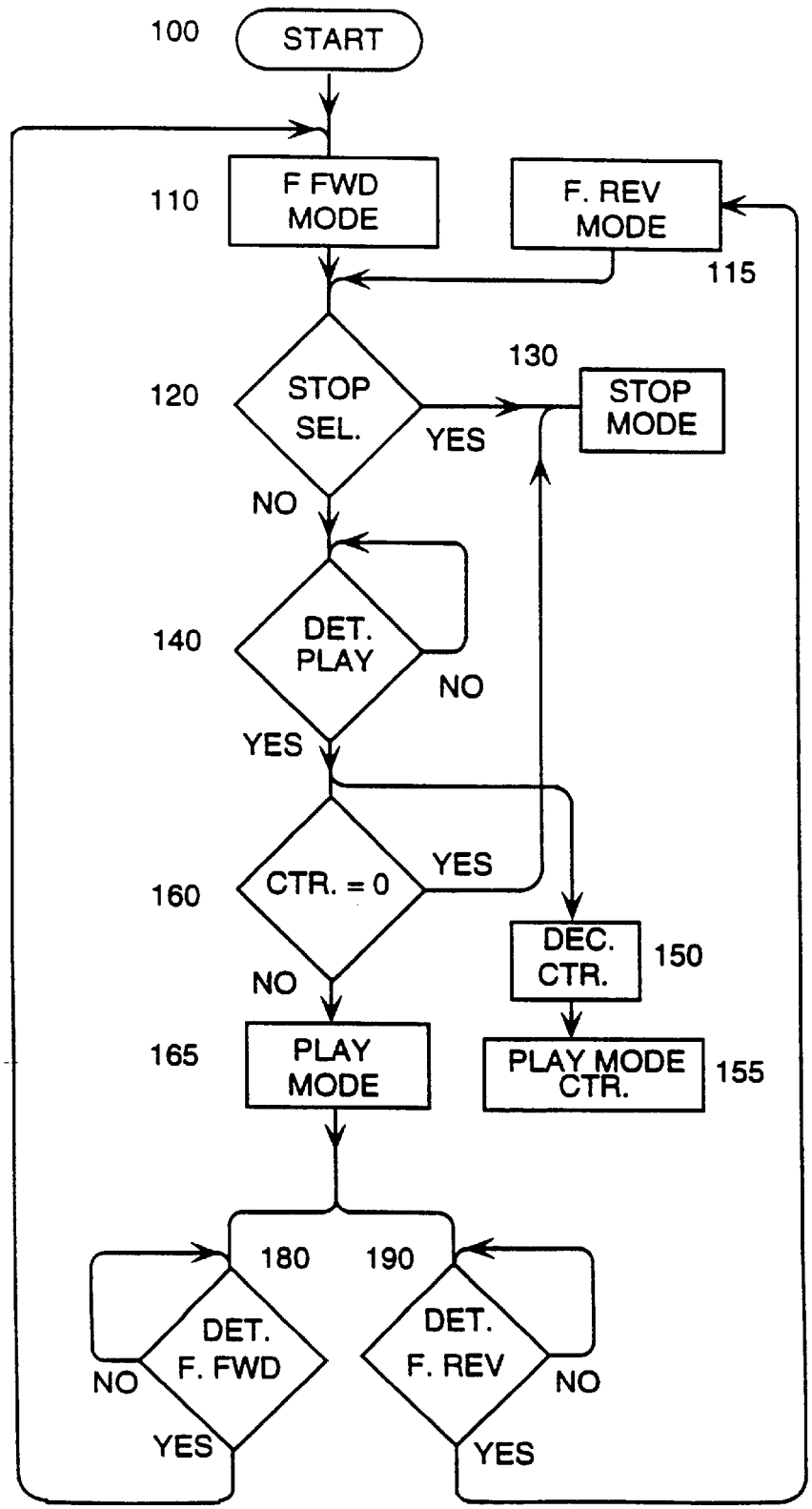
FIG. 4 depicts an inventive series of control steps for image replay control.

An exemplary automatic presentation sequence based on the foregoing codes is depicted in FIG. 4. The automated presentation sequence starts at step 100 with the player recorder initiating a FORWARD WIND or SKIP FORWARD instruction at step 110. At step 120 a test is performed to determine if the STOP mode has been requested, where a YES causes the recorder/player to assume a stopped condition at step 130 and to wait restart at step 100 via a menu selection. A NO at step 120 results in a further test at step 140 to determine if a PLAY MARK has been detected from the encoded control track. A NO at step 140 forms a loop which waits for the occurrence of a PLAY MARK, allowing the recorder/player to continue to skip forward. If the test for a PLAY MARK at step 140 results in a YES, the control sequence triggers decrementing of a counter at step 150. The count value at step 155 is calculated from the number of PLAY MARKS recorded multiplied by the number of repeat loops encoded in the PLAY MARKS. If for example, a continuously repeating display announcement or advertisement is required, PLAY MARK "0000" may result in step 150 being ignored or may cause the count value to be set to a high value. Back in the main branch of the flowchart of FIG. 4, step 160 tests the count for a zero value. A YES signifies completion of the predetermined number of loops of the programmed replay sequence and initiates the STOP mode at step 130. A NO at step 160 selects the PLAY mode at step 165.

After initiating the PLAY mode, the control sequence branches to step 180 and enters a status check condition which tests for the detection of either a forward or reverse FAST FORWARD (or REVERSE) or SKIP command. A NO at step 180, forms a wait loop, and YES returns to step 110 and assumes a FORWARD WIND mode to recommence the control sequence at step 120. A second branch from step 165, tests at step 190 for the detection of a REVERSE WIND or SKIP BACK command, where a NO forms a wait loop, and YES returns to step 115 and assumes a REVERSE WIND mode to recommence the control sequence. In this manner the codes programmed in the command track enable the recorder/player to progress in both directions through a sequence of segments that are played or skipped over.

In the following example, the user may manually select recorded material for subsequent viewing and identify selections with control marks. Thus when the tape is subsequently viewed, the wanted selected are replayed and the unwanted sections are wound past. This replay control capability may facilitate educational applications. For example, long duration recordings of traffic flow patterns, behavioral studies, scientific experimentation, psychiatric sessions or surgical procedures may be marked for the detailed review of portions of particular interest for training and educational purposes or for analysis, with unwanted intervening material skipped over. The ability to manually select and mark recorded material for subsequent viewing may also be advantageous for manufacturing process review and the derivation of training material therefrom.

The following method may be employed to facilitate user selection and programming of replay and skipped material. The user may program the replay sequence by entering an on screen menu selection named EDIT on the main menu, and selecting a PLAY and SKIP sub-menu. The PLAY and SKIP menu comprises a START MARKING? entry, the selection of which causes a prerecorded tape containing wanted material to be rewound to the beginning. The VCR automatically initiates the PLAY mode and overwrites the control track with a FORWARD WIND or SKIP FORWARD command. Upon completion of SKIP FORWARD marking the VCR assumes a forward scan mode to permit high speed program review until the wanted material is observed, whereupon the user selects PLAY from the menu. The PLAY selection results in the tape backing up a predetermined distance to permit the accurate location of the start of the replay section. Having located the play start location a PLAY MARK? entry in the menu is selected by the user, causing the control track to be overwritten the with a PLAY MARK. The tape is then played forward. At the end of the wanted material, the user selects a SKIP FORWARD? menu selection and acknowledges YES, causing the control track to be overwritten the with a SKIP FORWARD MARK. The PLAY and SKIP FORWARD marking may continue as described to the end of the wanted material. At the end of the last wanted section the user selects "END MARKING?" from the menu which results in the control track being overwritten with a STOP command.

When the tape as thus marked is replayed from the beginning, the VCR assumes a wind mode responsive to the encoded SKIP FORWARD command. The VCR assumes a play mode upon detection of the encoded PLAY MARK and continues playing until a SKIP FORWARD command is decoded. Thus the user programmed play/skip sequence continues until the END mark is detected.

Additional user programmed control commands may advantageously provide the capability to edit FORWARD WIND MARKS, for example, to eliminate program content marred by incorrect automatic identification of commercial messages. The user may also erase PLAY MARKS, for example, to remove incorrect or unwanted commercial end identifications, or to prevent unwanted PLAY mode selection during tape shuttle operation, as well as alter the encoding, for example, to change the number of repeat cycles. A properly encoded commercial skipping tape may contain wanted commercial viewing. Thus the user may choose to erase FORWARD WIND MARKS, to facilitate viewing wanted commercials. Conversely, an improperly encoded commercial skipping tape may contain unidentified and unwanted commercial viewing, thus the user may be enabled to record FORWARD WIND MARKS and RESUME PLAY MARKS, in order to skip unwanted commercial viewing.

The following are examples of possible methods where the user may permanently prevent skipping at specific tape locations by erasing control marks. When replaying a tape encoded with commercial skipping control signals, the user may observe program material, or a group of skipped commercial advertising at a specific tape location. The following methods may be employed to permanently prevent skipping by control mark erasure.

A) During or immediately following a commercial skip, the user may select a DISPLAY key (or specially assigned key) located on either a remote control unit or on the recorder player. DISPLAY key operation causes the recorder player to rewind to just before the last FORWARD WIND MARK. The recorder player then enters the PLAY mode, and overwrites the group of 27.5% control track pulses signifying the FORWARD WIND command, with control track pulses having the standard duration.

B) Alternatively the user may position the tape to be before or after the skipped section. The microprocessor control system stores the address of the last skipped section. The user selects an EDIT menu provided by an on screen display OSD which offers an exemplary selection of:
1) Play last/next skipped section?
2) Delete last WIND/PLAY mark?
3) Delete next WIND/PLAY mark?
4) Delete all WIND/PLAY marks?

The first option facilitates the review of the last or next skipped section prior to editing the control marks.

In the following example a user views a tape encoded with commercial skipping control signals, and during a commercial skip observes an interesting image. The user is desirous of replaying and viewing the skipped material once without skipping. Advantageously, this can be accomplished with a minimum of control interaction, i.e., without the need for multiple key strokes to disable commercial skipping. For example, the user of a commercial marking system that inserts command codes in a manner that is not reprogrammable, may need to enter a menu to turn OFF commercial skipping, exit the menu, rewind the tape to the beginning of the commercial group, and finally select the PLAY mode to view the commercial of interest. After viewing ,the user must re-enter the menu system, turn ON commercial skipping, and exit the menu. For simplicity of description, it is assumed in the above scenario that the user accurately rewound the tape to the beginning of the commercial group without overshooting and necessitating selection of the Fast-Forward mode, which would add additional key strokes and delay.

The following method may be employed to facilitate an automated replay without skipping of a skip encoded commercial block. The user selects a DISPLAY key (or specially assigned key) on the remote control unit. The DISPLAY key causes the tape to be automatically rewound and search for the commercial skip FORWARD WIND MARK. Having located the FORWARD WIND MARK, commercial skipping is temporarily disabled, for example by software control. The VCR automatically enters PLAY mode and plays the commercial group. Upon detection of the RESUME PLAY MARK the VCR automatically re-enables the commercial skipping mode.

We claim:

1. A video recording and playback apparatus, comprising:
a video recorder including a drive, for recording a video program signal in a first track on a storage medium, and for playback of the video program recording from the storage medium;
a control track signal processor for recording a control track signal encoded with digital data in a second track on the storage medium;
a decoder responsive to the control track signal upon playback of the video program recording, for decoding the digital data and coupling the digital data to the drive for switching the apparatus among a forward play mode, a forward skip mode and a rewind mode, as a function of respective play, skip and rewind codes in the digital data, for selectively replaying, a predetermined number of occurrences, sections of the video program preceded by a play code and followed by a rewind code, said predetermined number being determined in response to said digital data.

2. The video recording and playback apparatus of claim 1, further comprising a controller operable to continue replaying said sections of the video program preceded by the play code and followed by the rewind code, for said predetermined number of replays.

3. The video recording and playback apparatus of claim 2, wherein the predetermined number is encoded on the control track with at least one of the play code and the rewind code.

4. The video recording and playback apparatus of claim 3, wherein the play and rewind codes, in the digital data, are represented by a plurality of bits contained in a digital bit stream, and wherein the predetermined number is encoded in the digital bitstream with said plurality of bits.

5. The video recording and playback apparatus of claim 1, further comprising user operable means for inserting or deleting the play, rewind codes and a skip code upon replay of the video program.

6. The video recording and playback apparatus of claim 4, further comprising user operable means for inserting or deleting the play, and rewind codes, and altering the predetermined number, upon replay of the video program.

7. The video recording and playback apparatus of claim 6, wherein the user operable means for inserting or deleting the codes and altering the predetermined number, comprises a user operable menu screen generated by the video recording and playback apparatus.

8. The video recording and playback apparatus of claim 7, wherein the menu screen is further operable under user control for temporarily disabling, selectively skipping or selectively replaying said sections based upon said codes.

9. The video recording and playback apparatus of claim 4, wherein the control track signal comprises a pulse signal with a predetermined mark to space ratio and having a leading edge and a trailing edge, the leading edge providing a timing reference, and wherein the plurality of bits are represented by pulses encoded to occur during a space period of the control track signal.

10. The video recording and playback apparatus of claim 9, further comprising means for distinguishing one of a leading and trailing edge of said pulses from said one of the leading and trailing edge of the control track signal.

11. The video recording and playback apparatus of claim 2, wherein the controller compares the predetermined number of replays with a count of decoded rewind codes, terminating repeated replay cycles when equal.

12. The video recording and playback apparatus of claim 1, wherein the decoded digital data further comprises codes for a forward play mode and a forward skip mode, for selectively skipping sections of the video program preceded by a skip code and followed by a play code.

13. A video recording and playback apparatus, comprising:

a video recorder including a drive, for recording a video program signal in a first track on a storage medium, and for playback of the video program recording from the storage medium;

a control track signal processor for recording a control track signal encoded with digital data in a second track on the storage medium;

a decoder responsive to the control track signal upon playback of the video program recording, for decoding the digital data and coupling the digital data to the drive for switching the apparatus among a forward play mode, a forward skip mode and a rewind mode, as a function of respective play, skip and rewind codes in the digital data, for selectively skipping sections of the video program preceded by a skip code and followed by a play code, and for selectively replaying, a predetermined number of occurrences, sections of the video program preceded by a play code and followed by a rewind code, said predetermined number being determined in response to said digital data.

* * * * *